Feb. 22, 1938.  A. W. ROSEN  2,109,142
CLAMPING MEANS FOR MIRRORS FOR MOTOR VEHICLES
Filed July 30, 1937

Abraham W. Rosen
INVENTOR.

BY Walter E. Wallheim
ATTORNEY.

Patented Feb. 22, 1938

2,109,142

UNITED STATES PATENT OFFICE 2,109,142

CLAMPING MEANS FOR MIRRORS FOR MOTOR VEHICLES

Abraham W. Rosen, New York, N. Y.

Application July 30, 1937, Serial No. 156,473

3 Claims. (Cl. 248—226)

This invention relates to rear vision mirrors and more particularly to the kinds equipped with swivel joints of the construction disclosed in Patent #1,816,700 issued to me on July 28, 1931.

It is the principal object of the invention to provide mirrors of that kind with novel clamping means which may be fastened about the door frame of an automobile so as to effectually position and support the mirror against displacement through vibration and opening and closing and inadvertent slamming of the door and which will not interfere with the operation of the door.

Another object is to provide clamping means of a character which will not mar the outside polished surface of the door, and at the same time exert more pressure against the door frame than clamping means known heretofore.

A further object is to provide a universally adjustable mirror with effective clamping means which can readily be applied and which will be of simple and inexpensive construction, attractive in appearance, and dependable in use.

With the above and other objects in view, a preferred embodiment of the invention is shown in the accompanying drawing in which Fig. 1 is a plan view of a mirror clamped to the door frame of a motor vehicle, a fragmentary sectional view of which is shown;

Like characters of reference denote similar parts throughout the several views and the following specification.

Figure 1:
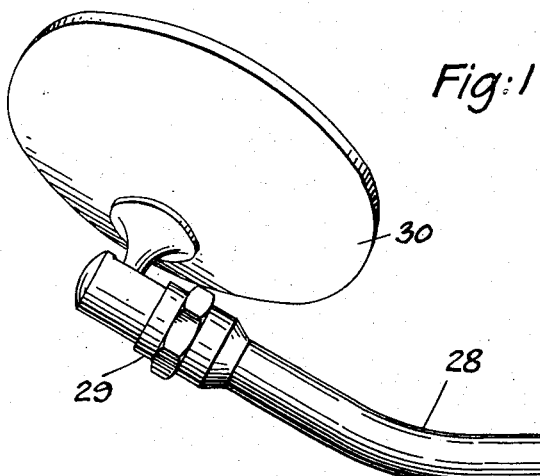
Figure 2:
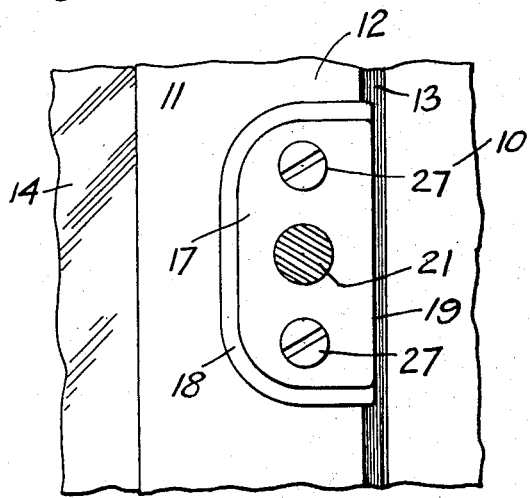
Fig. 2 is an elevational view, partly in section, taken along the plane of line 2—2 in Fig. 1.
Figure 3:
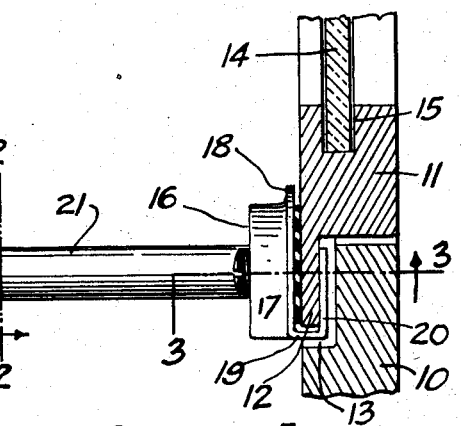
Fig. 3 is a longitudinal sectional view taken along the plane of line 3—3 in Fig. 1.
Figure 4:
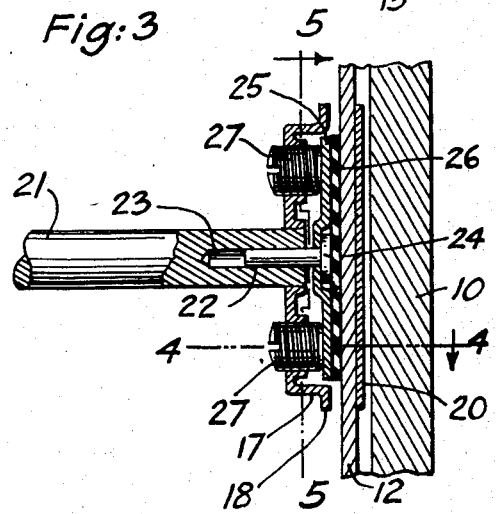
Fig. 4 is a cross-sectional view taken along the plane of line 4—4 in Fig. 3 in which the door frame has been omitted.
Figure 5:
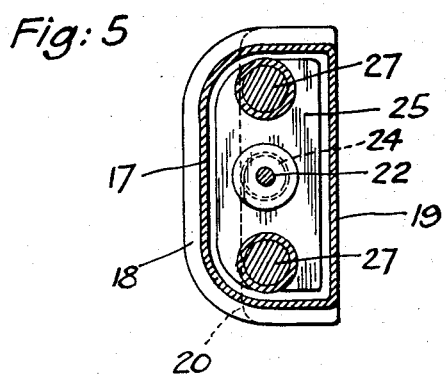
Fig. 5 is a longitudinal sectional view taken along the plane 5—5 in Fig. 3 in which the door frame has also been omitted for sake of clearness.

10 is a jamb for a door 11 of a motor vehicle. 12 is a laterally extending flange of the door which extends into a recess 13 of the jamb. 14 is a glass window slidingly fitted within a recess 15 of the door. These parts are shown more or less diagrammatically and for the purpose of illustrating a typical application of the invention only.

16 is a clamping member consisting of an elongated substantially rectangular cup-shaped base 17 having on three sides a slightly outwardly extending flange 18 and one of its long sides bent over at 19 to extend parallel to the base 17 at 20 forming a U therewith.

A carrying rod 21 is riveted or otherwise tightly secured to the center of the base 17. 22 is a guide pin slidingly engaging a bore 23 in the end of rod 21. 24 is an enlarged head of the pin 22. 25 is a follower plate substantially rectangular in outline and fitting loosely within the inside of the base 17. The center of the plate 25 is depressed to receive the head 24 of the pin 22 which is securely riveted or otherwise fastened to it, so that the outside of the head and the outside of the plate present a straight surface.

26 is a rubber plate or cushion of substantially the same contour as follower plate 25. It may be somewhat larger, but not beyond the outline of the flange 18 of the base 17 within the confines of which the rubber plate 26 should be located. Rubber plate 26 is preferably, but not necessarily, glued or otherwise fastened to follower plate 25.

27 are slotted set screws in threaded engagement with the base 17 straddling the rod 21 and bearing against the plate 25.

Rod 21 is preferably bent at 28 and has fastened to it by means of a ball and socket joint 29 a mirror 30. The details of the joint 29 are substantially the same as those shown in Patent #1,816,700 issued to me on July 28, 1931.

The entire mirror assembly is readily applied to the motor vehicle by simply slipping the clamp 16 over the outwardly projecting flange 12 of the door 11, the flange fitting within the U formed with the extension 20 of the base 17. In this position, the rubber plate 26 contacts with the outside of the door. The set screws 27 are then screwed into the base 17 and force the follower plate 25 against the rubber plate 26 causing it to contact tightly with the door.

The follower plate 25 is always held by virtue of the guide pin 23 parallel to the rubber plate because it cannot tilt due to the close fit of the pin within the bore 23. Thus there will always be a uniform pressure between the rubber plate and the door flange, even should there be an uneven adjustment of the set screws. The relatively large contact surface of the rubber plate obviously prevents marring of the surface of the door as compared with clamping devices formerly employed in which either two set screws individually bear against individual round washers concentrating pressure in spots and usually marring the surface, or in which two arms straddling the door, are drawn together by clamp screws.

Attention is particularly drawn to the fact that by means of the construction disclosed an exceptional large frictional contact is established between the door and the clamp and, it being elongated downwardly, resists downward sliding more effectively than were the set screws and the base of the clamp with its plates disposed laterally. This is especially important in mirrors of the kind illustrated, because the swivel at the mirror itself at the end of the carrier rod causes a particular severe strain upon the clamp when adjusting the mirror.

While I have shown the clamp attached to the door of a motor vehicle as a preferred application, the same may, of course, be fitted to any other suitable part of a vehicle. It is obvious therefore that various other changes in form, proportions and minor details of construction may be resorted to without departing from the principles or sacrificing any of the advantages of the invention as defined in the appended claims.

What I claim as new, is:

1. A clamp adapted to be fastened to the door flange of a motor vehicle consisting of an elongated base, having its center rigidly connected to a mirror carrying rod and having one of its long sides extended to form a U to slip over the said flange, an elongated plate loosely fitted within the base having a central guide pin slidingly engaging a bore within the said rod and having a resilient cushion, and a set screw at each side of the said rod and through the elongated ends of the said base adapted to force the said plate and cushion uniformly against the said flange.

2. A mounting for vehicle mirrors comprising a carrying rod, a ball and socket joint adjacent the mirror at one end and a clamp at the other end of the rod, the clamp consisting of an elongated base having its center rigidly connected to the said rod and having one of its long sides extended to form a U, an elongated plate loosely fitted within the base having a central guide pin slidingly engaging a bore within the said rod and having a resilient cushion, and a set screw at each side of the said rod and through the elongated ends of the said base to contact with the said plate.

3. A mirror assembly adapted to be fastened to the door flange of a motor vehicle comprising a mirror adjustably mounted upon one end of a carrying rod and a clamp fastened to the other end of the said rod, the clamp consisting of an elongated cup-shaped base having its center rigidly connected to the said rod and having one of its long sides extended to form a U to slip over the said flange, an elongated plate loosely fitted within the base having a central guide pin slidingly engaging a bore within the said rod and having a resilient cushion, and a set screw at each side of the said rod and through the elongated ends of the said base to force the said plate and cushion uniformly against the said flange.

ABRAHAM W. ROSEN.